(12) United States Patent
Paillot et al.

(10) Patent No.: US 6,424,775 B1
(45) Date of Patent: Jul. 23, 2002

(54) SINGLE MODE DISPERSION-SHIFTED OPTICAL FIBER COMPRISING AN EXTERNAL REFRACTIVE INDEX RING

(75) Inventors: Marianne Paillot, Asnieres; Jean-Claude Rousseau, Chatou, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/509,938
(22) PCT Filed: Aug. 13, 1999
(86) PCT No.: PCT/FR99/01985
§ 371 (c)(1),
(2), (4) Date: Apr. 9, 2000
(87) PCT Pub. No.: WO00/10043
PCT Pub. Date: Feb. 24, 2000

(30) Foreign Application Priority Data

Aug. 13, 1998 (FR) .............................................. 98 10382

(51) Int. Cl.⁷ .................................................. G02B 6/16
(52) U.S. Cl. ..................................................... 385/123
(58) Field of Search ................................ 385/123, 124, 385/126, 127, 128

(56) References Cited

FOREIGN PATENT DOCUMENTS

| DE | 3842805 A1 | * | 6/1990 |
| EP | 0 127 408 A1 | | 12/1984 |
| EP | 0 341 427 A2 | | 11/1989 |
| EP | 0 775 924 A2 | | 5/1997 |
| EP | 0 902 307 A1 | | 3/1999 |
| GB | 2-116744 | * | 3/1982 |
| JP | 59-232302 A | * | 12/1984 |
| JP | 1-207705 A | * | 8/1989 |
| JP | 2-23305 A | * | 1/1990 |
| JP | 10-186156 A | | 7/1998 |

OTHER PUBLICATIONS

Patent Abstracts of Japan, vol. 1998, No. 5, Apr. 30, 1998 corresponding to JP 10 010350 Furukawa Electric Co Ltd . . . ) dated Jan. 16, 1998.

"New Designs for Dispersion–Shifted and Dispersion–Flattened Fibers", Proceeding of the SPIE, vol. 1176. Sep. 5, 1989 pp. 196–201.

Naoki, translation of JP's pat. No. 10010350, published on Jan. 1988.*

* cited by examiner

Primary Examiner—Ellen E. Kim
(74) Attorney, Agent, or Firm—Sughrue Mion, PLLC

(57) ABSTRACT

The invention relates to a dispersion-shifted single-mode optical fiber having:
- cladding of given refractive index ($n_s$); and
- a fiber core having an index profile that is Gaussian with a pedestal, i.e. a "dual shape core" index profile;
- said fiber being characterized in that the index profile of the fiber core has an outer ring of index ($n_3$) greater than the index ($n_s$) of the cladding.

The invention provides better control over the wavelength at which chromatic dispersion is zero, while conserving the other transmission characteristics of known fibers, such as mode diameter and attenuation.

15 Claims, 2 Drawing Sheets

SINGLE MODE DISPERSION-SHIFTED OPTICAL FIBER COMPRISING AN EXTERNAL REFRACTIVE INDEX RING

BACKGROUND OF THE INVENTION

The present invention relates to a dispersion-shifted single-mode optical fiber.

Single-mode optical fibers that are referred to as "dispersion-shifted fibers" (DSFs) are such that, at the transmission wavelength at which they are used (which wavelength is, in general, different from the wavelength of 1.3 $\mu$m for which the dispersion of silica is substantially zero), the chromatic dispersion of the transmitted wave is substantially zero; i.e. the non-zero chromatic dispersion of silica is compensated (hence, the use of the term "shifted") by increasing the index difference $\Delta n$ between the core of the fiber and the optical cladding. This index difference makes it possible to shift the wavelength for which the chromatic dispersion is zero. It is obtained by inserting dopants into the fiber while it is being manufactured, e.g. by a modified chemical vapor deposition (MCVD) process that is known per se, and that is not described in any more detail herein. A typical value for the index difference between the cladding and the core of the fiber is $24 \times 10^{-3}$. The increase in refractive index in silica can be obtained by using germanium as the dopant. The terms "cladding" and "core" are known to the person skilled in the art; conventionally, the "cladding" is the portion that extends to a diameter of 125 $\mu$m. The core corresponds to the portion in which about 70% of the light energy propagates.

Such single-mode fibers must also preferably have characteristics that correspond to the requirements both of cable-makers and of system designers: firstly they must have small mode diameters, and good "cablability" (i.e. suitability for being included in a cable), involving bending capacity of the fiber and low attenuation; and secondly they must have mode diameters that are as large as possible, large effective areas, and suitable values for the zero-dispersion wavelength $\lambda_0$. When such fibers are used for wavelength-division multiplexed (WDM) transmission systems, the constraints are even more stringent.

It would be preferable to use a fiber having a $\lambda_0$ value that is greater than or equal to 1565 nm, and advantageously that is greater than or equal to 1585 nm, in order to avoid using a dispersion-compensating fiber (DCF), which suffers from the drawbacks of facilitating non-linear effects, of having high attenuation, and of being difficult to lay in a cable. Unfortunately, existing fibers having such $\lambda_0$ values have small effective areas or high attenuation around 1550 nm.

Numerous index profiles have been proposed for such dispersion-shifted single-mode optical fibers. The index profile is generally described as a function of the appearance of the curve representing the refractive index as a function of the radius of the fiber. The index profile is thus said to be "stepped", "trapezium-shaped" or "triangular" for curves representing the variation of refractive index as a function of radius that are respectively stepped, trapezium-shaped, or triangular. Such curves generally represent the ideal or reference profile of the fiber, it being possible for the constraints involved in manufacturing the fiber to give rise to a profile that is significantly different.

Early dispersion-shifted optical fibers were of the index-step, triangle, Gaussian, or $\alpha$ power type. The characteristics of those fibers are no longer considered to be sufficient, in particular because of their small mode diameters and of their sensitivity to bending, even though those fibers have attenuation values lower than 0.20 dB/km at 1550 nm. A new family of fibers has thus been developed: fibers whose index profiles are Gaussian with a pedestal, or "dual shape core" index profiles.

Thus, Patent Application EP-A-0 789 257 describes a fiber having an index profile that is Gaussian with a pedestal, i.e. that is a "dual shape core" index profile. The index profile of that fiber is shown in FIG. 1. That fiber has a mode diameter of 9 $\mu$m, a $\lambda_0$ wavelength of about 1582 nm.

Patent Document U.S. Pat. No. 5,278,931 describes an optical fiber having improved sensitivity to bending, with a core region having a refractive index greater than the refractive index of the remainder of the fiber, and a small diffusion tail at the interface between the core and the cladding. That document suggests optionally providing a ring of higher index appropriately chosen to lower the cutoff wavelength or to obtain a fiber that is less sensitive to bending.

Those various known solutions do not make it possible to obtain a $\lambda_0$ wavelength value that is high or that can be chosen freely, while also conserving the characteristics suitable for good "cablability".

SUMMARY OF THE INVENTION

The invention proposes a solution that makes it possible to maintain an effective area $A_{ef}$ that is large, typically above 70 $\mu$m$^2$, thereby limiting non-linear effects. The fiber of the invention also makes it possible to obtain attenuation that is low, preferably less than or equal to 0.2 dB/km. In addition, it makes it possible, for all these parameters, to obtain a zero chromatic dispersion wavelength $\lambda_0$ that is advantageously greater than or equal to 1585 nm; which makes it possible (if the fiber is used for WDM transmissions) to avoid or to limit four-wave mixing and the use of dispersion-compensating fibers.

In other words, the invention proposes a method of increasing the value $\lambda_0$ of the wavelength for which chromatic dispersion is zero in a dispersion-shifted single-mode optical fiber having cladding with a given index ($n_s$), a fiber core with an index profile that is Gaussian with a pedestal, i.e. a "dual shape core" index profile, and a mode diameter that is advantageously greater than or equal to 8 $\mu$m, including the addition in the index profile of the fiber core of an outer annular portion of index greater than the index of the cladding.

The invention thus provides a dispersion-shifted single-mode optical fiber having:

cladding of given refractive index; and a fiber core having an index profile that is Gaussian with a pedestal, i.e. a "dual shape core" index profile;

said fiber being characterized in that the index profile of the fiber core has an outer ring of index greater than the index of the cladding.

Advantageously, the index of said ring is greater than or equal to the index of the pedestal, and preferably lies in the range $1 \times 10^{-3}$ to $6 \times 10^{-3}$.

In an embodiment, said ring has a thickness lying in the range 0.3 times the radius of the Gaussian portion of the core to 0.8 times said radius.

In an embodiment, the maximum index of the Gaussian portion of the core is generally greater than or equal to $9.5 \times 10^{-3}$.

Preferably, the index of said pedestal is greater than the index of the cladding.

In an embodiment, the index of said pedestal generally lies in the range $1 \times 10^{-3}$ to $3 \times 10^{-3}$.

In another embodiment, the index between said pedestal and said ring is less than or equal to the index of the cladding. Such an index generally lies in the range 0 to $-0.5 \times 10^{-3}$.

Advantageously, the portion of the fiber between said pedestal and said ring has a thickness lying in the range 0.3 times the radius of the Gaussian portion of the core to 0.8 times said radius.

Between said outer ring and the cladding, the fiber may also have an annular portion of index less than or equal to the index of said outer ring and the index of the cladding. Such an index generally lies in the range 0 to $-0.5 \times 10^{-3}$.

The fiber of the invention is generally and preferably such that the value of the wavelength for which the chromatic dispersion is zero is advantageously greater than or equal to 1565 nm, and preferably greater than or equal to 1585 nm.

Advantageously, said fiber has an effective area greater than or equal to 70 $\mu m^2$.

Preferably, it has attenuation less than 0.2 dB/km for a wavelength value of 1550 nm.

The invention thus proposes to add a ring to existing fiber profiles of the Gaussian-with-pedestal or "dual shape core" type. It makes it possible to conserve low attenuation, and large effective area, while obtaining $\lambda_0$ values that are high and that are typically greater than or equal to 1565 nm, and advantageously greater than or equal to 1585 nm.

The invention generally makes it possible to obtain for the fiber a $\lambda_0$ wavelength of at least 1565 nm and preferably at least 1585 nm, together with the following characteristics:

an effective area greater than or equal to 70 $\mu m^2$; and attenuation of less than or equal to 0.2 dB/km for a wavelength value of 1550 nm.

BRIEF DESCRIPTION OF THE DRAWING

Other characteristics and advantages of the invention appear on reading the following description of various embodiments of the invention, given by way of example and with reference to the accompanying drawings, in which.

DETAILED DESCRIPTION OF THE INVENTION

Figure 1:
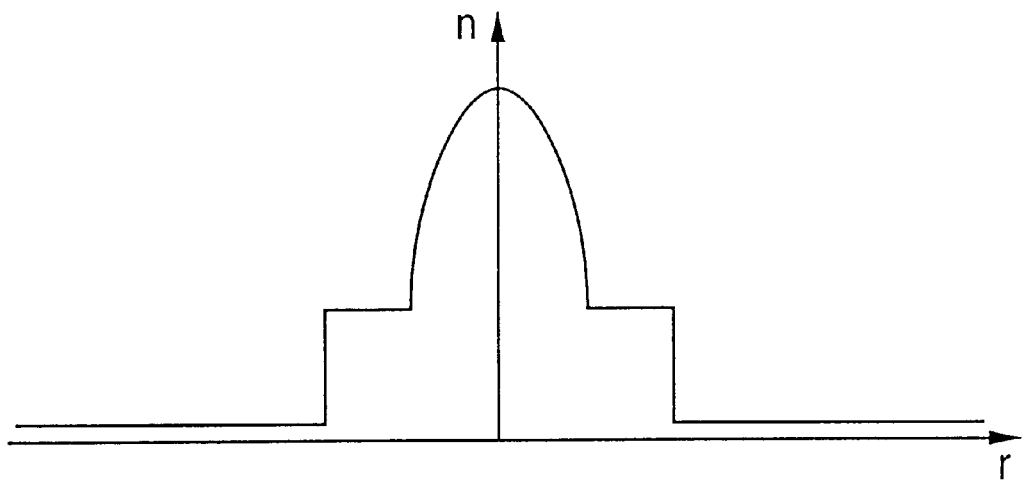
FIG. 1 is a diagram showing the reference index profile of a known dispersion-shifted single-mode fiber.

FIG. 1 has already been discussed.

EXAMPLE

Figure 2:
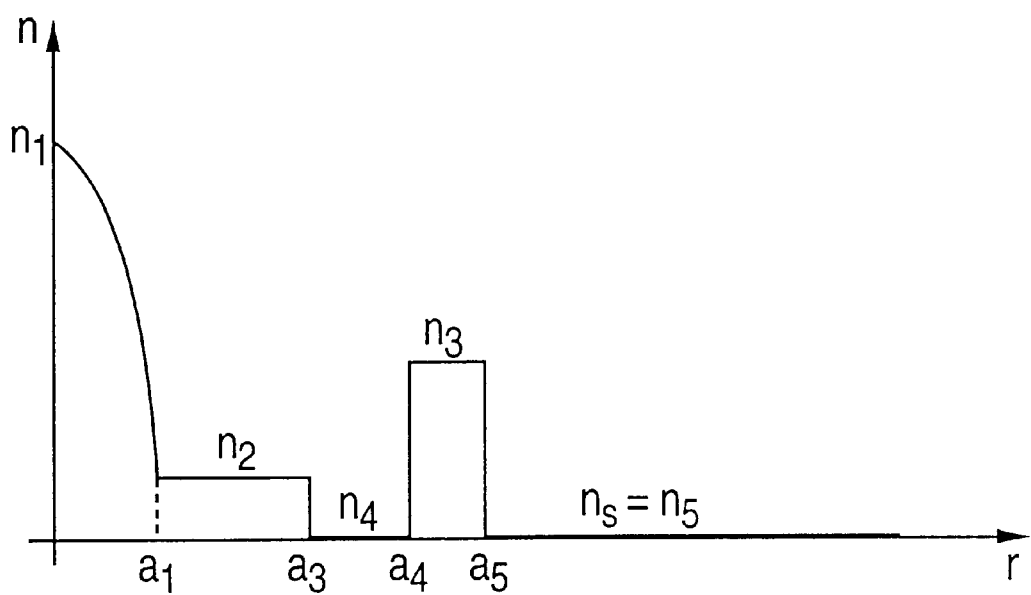
FIG. 2 is a diagram showing the index profile of a fiber of the invention.
Figure 3:
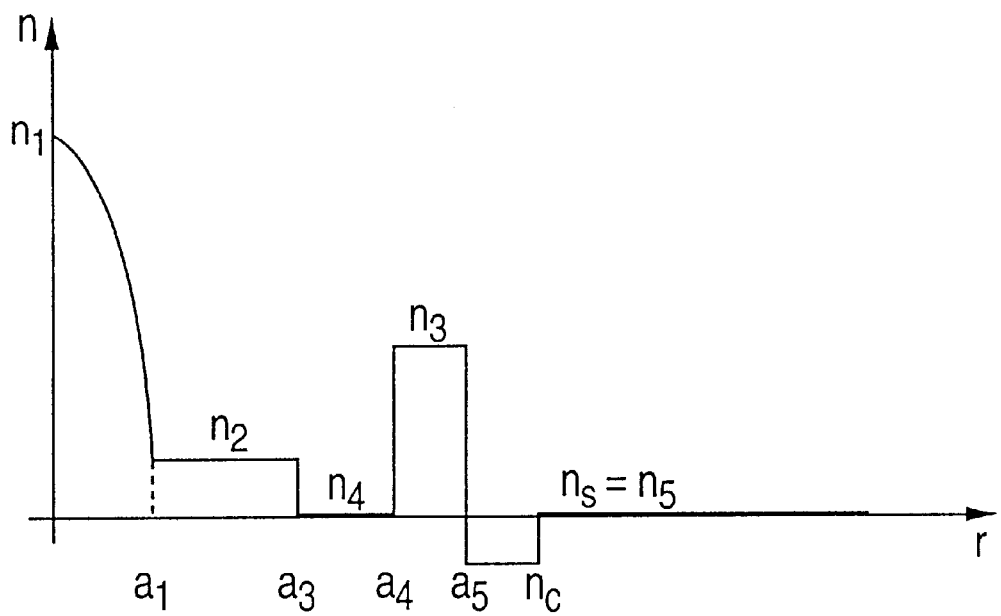
FIG. 3 is a diagram showing the index profile of a fiber of the invention having an annular portion $n_c$ less than the index $n_s$ of the cladding.

The invention proposes to add a ring to a Gaussian-with-pedestal or "dual shape core" index profile. FIG. 2 is a diagram of a fiber of the invention. The fiber of FIG. 2 has a fiber core with a Gaussian portion, for radii of less than $a_1$ in which the index varies in the range $n_1 = 11 \times 10^{-3}$ to $n_2 = 1.5 \times 10^{-3}$. $a_1$ lies in the range 2.5 $\mu m$ to 4 $\mu m$. Around the Gaussian portion, the fiber has a pedestal, of index $n_2$ that is substantially constant, from radii $a_1$ to $a_3$; $a_3$ is equal to in the range two times $a_1$ to three times $a_1$.

Figure 4:
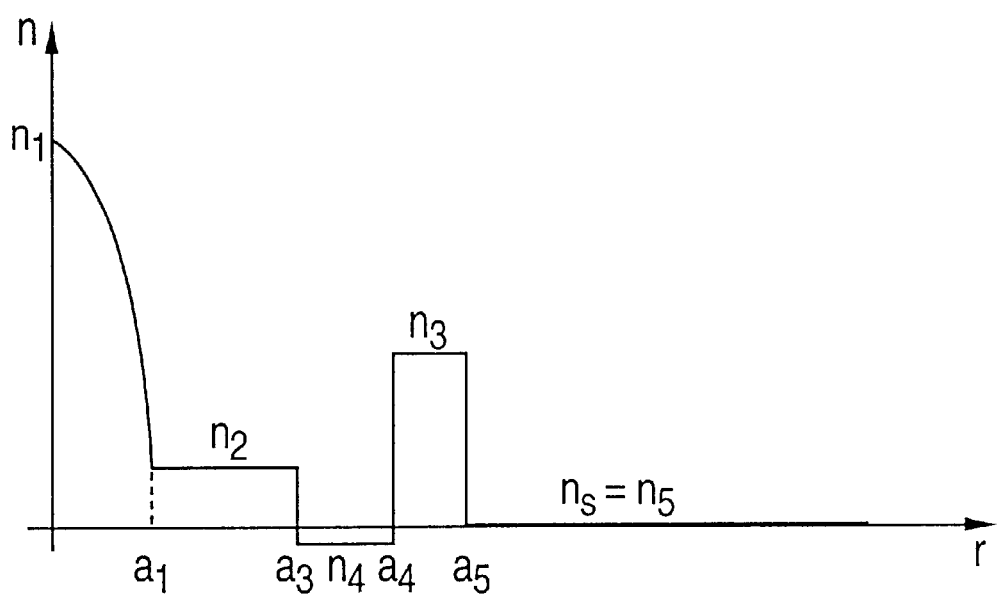
FIG. 4 is a diagram showing core index profile of a fiber of the invention having an index $n_4$ between the pedestal and the ring that is less than the index $n_s$ of the cladding.

Around this pedestal, the invention provides a ring; the ring is separated from the pedestal by an annular portion, from radii $a_3$ to $a_4$, of index $n_4$ less than the index of the pedestal, and, for example, less than the index of the cladding $n_s$ (see FIG. 4); a value of about $0.5 \times a_1$ for $a_4 - a_3$ gives good results. More generally, a value in the range 0.3 times $a_1$ to 0.8 times $a_1$ is appropriate. It is also possible to choose an annular portion of index $a_4$ greater than or equal to the index of the cladding $n_s$.

The invention then provides the ring which has an index $n_3$ greater than the index of the cladding $n_s$ and than the index of the annular portion $n_4$. For example, the ring has an index $n_3$ of $4 \times 10^{-3}$, and extends over the radii lying in the range $a_4$ to $a_5$, where $a_5 - a_4$ has a value of about $0.5 \times a_1$. More generally, a value for $a_5 - a_4$ lying in the range 0.3 times $a_1$ to 0.8 times $a_1$ is appropriate.

The cladding of index $n_s$ extends around the ring. In particular if it facilitates manufacturing the fiber, it is possible, immediately before the cladding, to provide a second annular portion of index $n_c$ that is less than the index of the cladding $n_s$, and less than the index $n_3$ of the ring. This index $n_c$ may be greater than or less than the index $n_4$ between the pedestal and the ring.

The invention improves the transmission characteristics of prior art fibers, because it makes it possible to increase the value $\lambda_0$ for which chromatic dispersion is zero; by way of comparison, it is possible to consider an optical fiber having a conventional Gaussian-with-pedestal or "dual shape core" index profile, as shown in FIG. 7 of EP-A-0 789 257. Such a fiber has the following characteristics:

$\lambda_0 = 1582$ nm;

mode diameter: 10.1 $\mu m$; and cutoff wavelength: 1690 nm.

In comparison, in the invention, adding a ring as in the profile shown in FIG. 2 makes it possible to reduce the attenuation by 0.01 dB/km at 1550 nm, to reduce the cutoff wavelength, and to increase the effective area by 10 $\mu m^2$.

In the example shown, the indices $n_4$ and $n_5$ are equal to the index $n_s$ of silica and are mutually equal. The invention may thus be implemented with index values $n_4$ and $n_5$ that are different from each other, and greater than or equal to the index of the cladding $n_s$.

Naturally, the present invention is not limited to the embodiments described and shown, but rather numerous variants are accessible to the person skilled in the art.

What is claimed is:

1. A dispersion-shifted single-mode optical fiber having:

cladding of given refractive index ($n_s$); and a fiber core having an index profile that is Gaussian with a pedestal, said fiber being characterized in that the index profile of the fiber core has an outer ring of index ($n_3$) greater than the index ($n_s$) of the cladding, such that the index ($n_4$) between said pedestal and said ring is less than or equal to the index ($n_s$) of the cladding.

2. A fiber according to claim 1, such that the index ($n_3$) of said ring is greater than or equal to the index ($n_2$) of the pedestal.

3. A fiber according to claim 2, such that the index ($n_3$) of said ring lies in the range $1 \times 10^{-3}$ to $6 \times 10^{-3}$.

4. A fiber according to claim 1, such that the maximum index ($n_1$) of the Gaussian portion of the core is greater than or equal to $9.5 \times 10^{-3}$.

5. A fiber according to claims 1, such that the index ($n_2$) of said pedestal is greater than the index ($n_s$) of the cladding.

6. A fiber according to claim 5, such that the index ($n_2$) of said pedestal lies in the range $1 \times 10^{-3}$ to $3 \times 10^{-3}$.

7. A fiber according to claim 1, such that said ring has a thickness ($a_5-a_4$) lying in the range 0.3 times the radius ($a_1$) of the Gaussian portion of the core to 0.8 times said radius.

8. A fiber according to claim 1, such that the index ($n_4$) between said pedestal and said ring lies in the range 0 to $-0.5 \times 10^{-3}$.

9. A fiber according to claim 1, such that the portion of the fiber between said pedestal and said ring has a thickness ($a_4-a_3$) lying in the range 0.3 times the radius ($a_1$) of the Gaussian portion of the core to 0.8 times said radius.

10. A fiber according to claim 1, such that the value of the wavelength for which the chromatic dispersion is zero is greater than or equal to 1565 nm.

11. A fiber according to claim 10, such that the value of the wavelength for which the chromatic dispersion is zero is greater than or equal to 1585 nm.

12. A dispersion-shifted single-mode optical fiber having:

cladding of given refractive index ($n_s$); and a fiber core having an index profile that is Gaussian with a pedestal;

said fiber being characterized in that the index profile of the fiber core has an outer ring of index ($n_3$) greater than the index ($n_s$) of the cladding, such that, between said outer ring and the cladding it has an annular portion of index ($n_c$) less than the index ($n_3$) of said outer ring and the index ($n_s$) of the cladding.

13. A fiber according to claim 12, such that said index ($n_c$) lies in the range 0 to $-0.5 \times 10^{-3}$.

14. A dispersion-shifted single-mode optical fiber having:

cladding of given refractive index ($n_s$); and a fiber core having an index profile that is Gaussian with a pedestal;

said fiber being characterized in that the index profile of the fiber core has an outer ring of index ($n_3$) greater than the index ($n_s$) of the cladding, such that it has an effective area greater than or equal to 70 $\mu m^2$.

15. A dispersion-shifted single-mode optical fiber having:

cladding of given refractive index ($n_s$); and a fiber core having an index profile that is Gaussian with a pedestal;

said fiber being characterized in that the index profile of the fiber core has an outer ring of index ($n_3$) greater than the index ($n_s$) of the cladding, such it has attenuation less than 0.2 dB/km for a wavelength value of 1550 nm.

* * * * *